US005797427A

United States Patent [19]

Buescher

[11] Patent Number: 5,797,427

[45] Date of Patent: Aug. 25, 1998

[54] FUEL INJECTOR CHECK VALVE

[76] Inventor: Alfred J. Buescher, 17001 Shaker Blvd., Shaker Heights, Ohio 44120

[21] Appl. No.: 728,752

[22] Filed: Oct. 11, 1996

[51] Int. Cl.[6] .......... F16K 15/00

[52] U.S. Cl. .......... 137/533.17; 137/543.21; 123/506

[58] Field of Search .......... 137/532, 543.21, 137/533.17; 123/446, 506

[56] References Cited

U.S. PATENT DOCUMENTS

| | | | |
|---|---|---|---|
| 2,200,903 | 5/1940 | Stephens | 137/232 |
| 2,430,427 | 11/1947 | Katcher | 137/543.21 |
| 3,580,273 | 5/1971 | Scgwarz et al. | 137/543.21 |
| 3,862,281 | 1/1975 | Uchiyama | 137/533.17 |
| 5,251,871 | 10/1993 | Suzuki | 251/127 |
| 5,328,094 | 7/1994 | Goetzke et al. | 239/88 |

*Primary Examiner*—Denise L. Ferensic
*Assistant Examiner*—Joanne Y. Kim
*Attorney, Agent, or Firm*—Pearne, Gordon, McCoy & Granger LLP

[57] ABSTRACT

A diesel engine unit injector is combined with a check valve having fuel delivery passages (notches or slots) with radially-inner edges that are concave in shape whereby areas of relatively high-velocity interfacial flow between the check valve disc and the surface on which it closes are minimized.

5 Claims, 3 Drawing Sheets

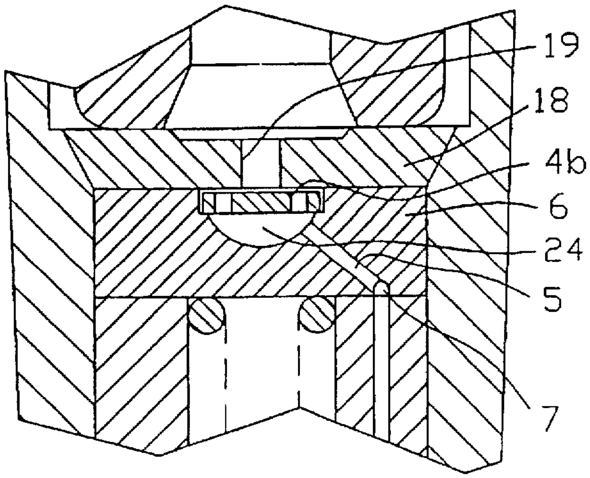
FIG. 2
PRIOR ART
PRIOR ART
FIG. 2A
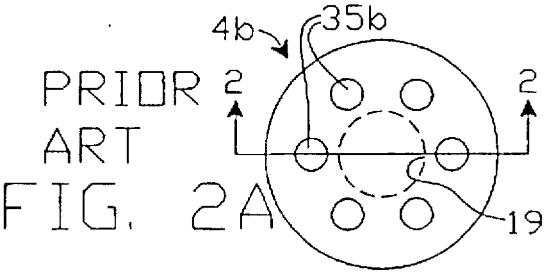
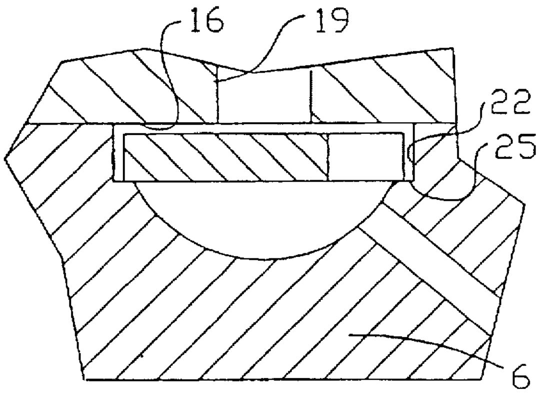
FIG. 3
FIG. 4
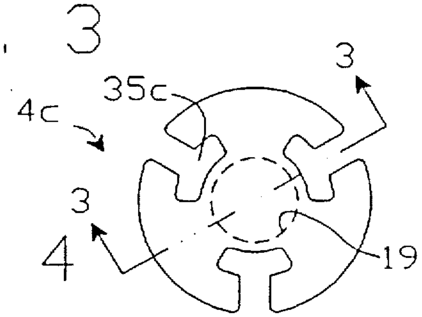

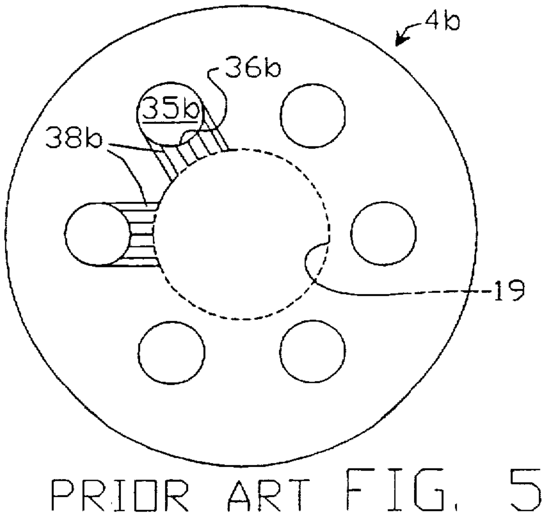
PRIOR ART FIG. 5
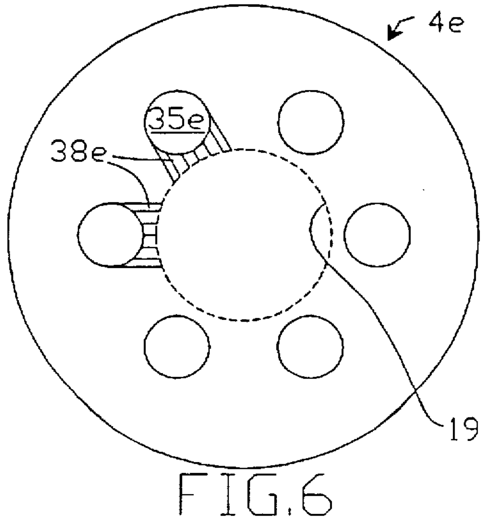
FIG.6
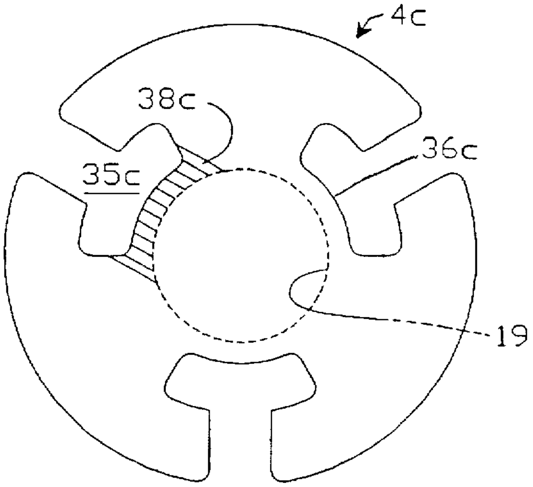
FIG. 7
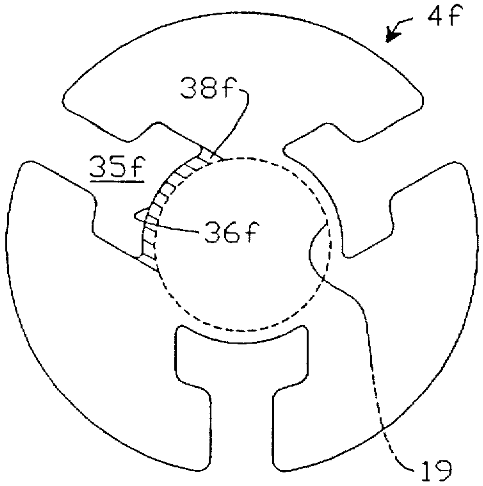
FIG.8
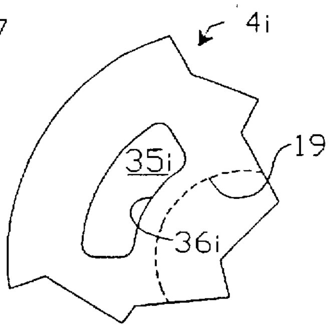
FIG. 10
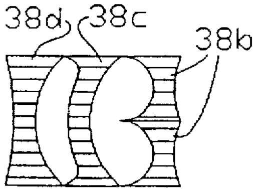
FIG. 11A
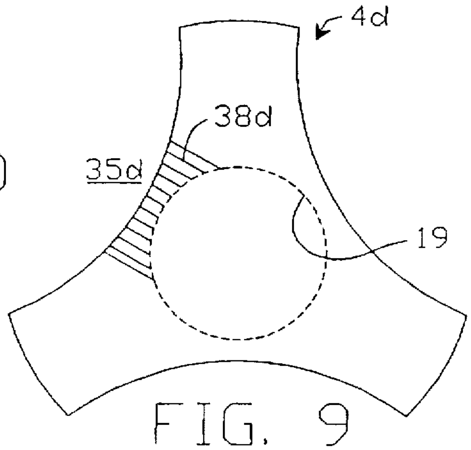
FIG. 9
FIG. 11B
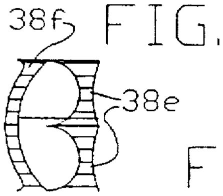
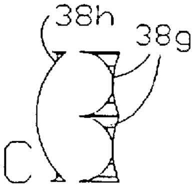
FIG. 11C

FUEL INJECTOR CHECK VALVE

FIELD OF THE INVENTION

This invention relates to improvements in check valves used in high pressure unit injectors for diesel engines, for example those used in EMD locomotive engines.

BACKGROUND

All modern unit injectors use a check valve interposed in the fuel path leading from the injector pumping element to the injection nozzle. The purpose of the check valve is to prevent back flow of fuel to the pumping element when the plunger spills, terminating fuel delivery by the plunger. The check valve also serves as a safeguard in preventing combustion gases from entering the injection nozzle in the event the nozzle valve seat fails and the seat becomes leaky.

The invention is useful in high pressure injectors of the type which incorporate a nozzle having a valve with differentially sized guide and seat so that there is a fixed relationship between the valve opening pressure and the valve closing pressure. During injector operation when the injector plunger covers the fillport, a pressure wave is generated which travels through the check valve inlet into the check valve chamber, opens the check valve, and travels downward through annuli and ducts within the check valve cage, spring cage and nozzle body to act on the conical differential area of the nozzle valve. Usually the first pressure wave is sufficient to lift the nozzle valve off its seat, and injection begins. If the pressure wave is insufficient to lift the valve, the pressure buildup that immediately follows will.

The valve stays lifted during the time fuel is being delivered by the injector plunger to the nozzle. When the plunger helix edge uncovers the spill port, the pressure above the plunger drops to fuel supply pressure and the check valve seats (upwardly) on the flat bottom surface of the spacer immediately above the check valve cage (which forms the upper wall of the check valve chamber), closing the check valve by sealing the inlet duct leading through the spacer to the check valve chamber. As these events occur, the pressure in the nozzle chamber drops rapidly; when it drops to the valve closing pressure, the injector valve closes and injection ends.

Prior to recent increases in ratings of engines in which unit fuel injectors are used, for example EMD locomotive engines, older designs of scalloped-edge check valves performed their function very well. A valve of such design allowed the fuel to flow downstream freely during fuel delivery by the pumping plunger. At the end of each fuel delivery it lifted and closed the check valve inlet by reason of the force of the fuel pressure beneath it. By this closing action it sealed the residual pressure between the nozzle seat and the pumping element during the intervals between fuel delivery events.

When engine ratings were increased, knocking occurred in some injectors during high output operation. In many cases this caused cracking of the plunger bushing. While this phenomenon is not clearly understood, it is believed to be related to a aspirator effect reported by P. H. Schweitzer in The Pennsylvania State College Engineering Experiment Station Series Bulletin No. 46, "Penetration of Oil Sprays." Dr. Schweitzer reported that under certain conditions when a fuel spray was injected through a hole in a shield disc and directed against a target disc, the spray and entrained air passing through the hole end impinging on the target disc exerted a pull on the target disc instead of a push. It was reported that the air passing along the interface between the two discs after passing through the hole exerted "a venturi-like aspirator effect" on the target disc. It was reported that if the clearance distance between the shield disc and the target disc was small, the fluid exerted a pull on the target disc; if the clearance was large it exerted a push. Thus, when the clearance was large there was no venturi-like aspirator effect on the target disc. This could be analogized to the action of the check valve in the injectors such as EMD injectors—the spacer above the check valve cage corresponding to the shield disc, the check valve inlet formed in the spacer corresponding to the hole in the shield disc, the check valve itself corresponding to the target disc, and the aspirator effect occurring at the interface between the flat bottom face of the spacer and the flat top face of the check valve, where the fluid flows interfacially between the two flat and interfacing surfaces.

U.S. Pat. No. 5,328,094 to Goetzke et al. seeks to address the knocking problem by employing a check valve in the form of a disc with an uninterrupted circular periphery and a plurality of equally spaced holes, each spaced wholly inwardly of the outer edge of the disc and provided "at locations which reduce the length of the radial flow path from the [inlet hole] to the nearest opening [in the valve disc] for fuel flow." If such design reduces the potential for knocking (or for occurrence of the Schweitzer aspirator effect) as compared to older designs, it cannot do so in the manner and to the extent made possible by the present invention.

BRIEF DESCRIPTION OF THE INVENTION

The invention reflects certain insights regarding improvement of check valve operation in high-rated EMD engines. One is that reduction of the total area over which the highest velocity interfacial flows occur should most favorably work against any tendency of the valve to exhibit the aspirator effect referred to above. The portion of the interfacial flow that is at relatively high velocity tends to flow along the shortest flow paths that are established between the inlet hole to the valve and the fuel delivery passages (notches or holes) that open through the valve disc. However, the length of such "shortest paths" varies from a minimum (the paths end at the locations of the bottom, i.e. radially innermost, points on the edges of the notches or holes, such points being at the minimum distance from the valve inlet) to greater lengths (the paths end where the edges of the notches or holes curve convexly away from their points of minimum distance from the valve inlet). A more detailed insight is that such area-reduction can be accomplished by more closely conforming the average length of all the paths of relatively high velocity interfacial flow to the length of the shortest paths, and that a simple and preferable manner to do this is by providing fuel delivery passages whose radially inner edges, or major portions thereof, are convex in shape, and preferably are spaced a constant radial distance from the inlet opening in the centered position of the valve.

Stated another way, it is the area rather than the minimum radial length (equal to sealing width when the valve is centered) of the high-velocity interfacial flow paths between the bottom face of the spacer and the top face of the check valve that is believed to be most important in countering the aspirator effect.

Another insight of the invention is that this area can be reduced from corresponding areas associated with check valves of the prior art without reducing the radial length of the flow path, if desired, thus avoiding any reduction in assured minimum sealing width or requirement for maintenance of tighter dimensional tolerances. Or, a better tradeoff can be provided between reducing interfacial flow path area, tightness of dimensional tolerances in the field, and achievement of a given assured minimum sealing width. That is, tightening of tolerances or reduction of minimum assured sealing width can be minimized by minimizing any reduction in radial flow path length as distinguished from flow path area.

These and other advantages of the invention will be better understood from the detailed description of the invention given below.

BRIEF DESCRIPTION OF THE DRAWINGS

In the drawings.

FIGS. 1 and 1A show the illustrated check valve positioned over (literally under) and centered on the associated inlet hole. All check valves seen in the other drawings similarly are shown positioned over and centered on an associated inlet hole.

FIG. 2 is a fragmentary cross-sectional view of the portion of the injector which includes the check valve; in this drawing the injector is shown using the later form of prior-art check valve mentioned above. Such check valve is shown in section, the section being taken on the plane of line 2—2 in FIG. 2A. The scale of FIG. 2 is larger than that of FIG. 1 but smaller than that of FIG. 1A.

FIG. 2A is a plan view on the same scale as FIG. 1A of the prior art check valve seen in FIG. 2.

FIG. 3 is a fragmentary cross-sectional view of the same portion of the injector structure in the area of the check valve chamber, but utilizing a check valve contemplated by the invention. The check valve is shown in section, the section being taken on the plane of line 3—3 of FIG. 4. FIG. 3 is on a scale somewhat larger than FIGS. 1A and 2A.

In the foregoing sectional illustrations, the thicknesses of the check valves are exaggerated for clarity of illustration.

Figure 1:
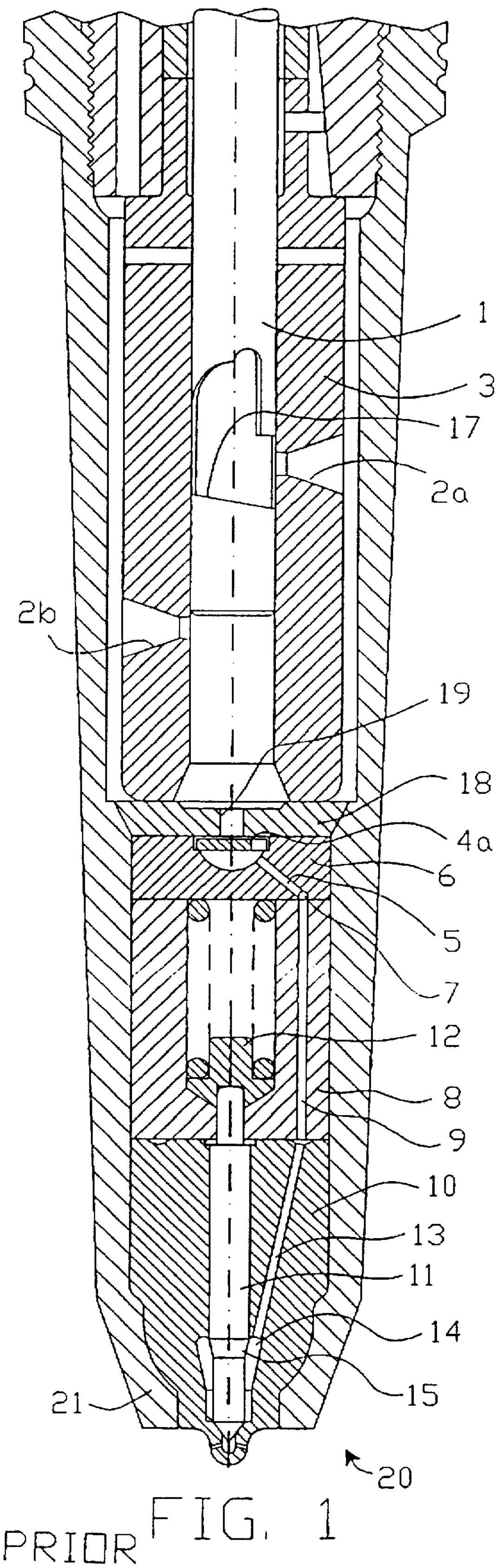
FIG. 1 PRIOR ART
FIG. 1 is fragmentary cross-sectional view of an EMD-type injector using a check valve of the prior art, with the top portions of the injector broken away and not shown. The check valve is shown in section, the section being taken on the plane of line 1—1 in FIG. 1A.
Figure 1A:
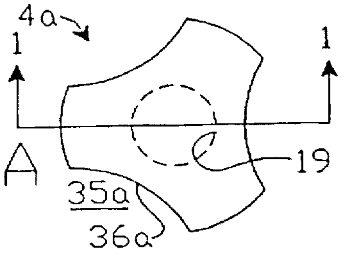
PRIOR ART FIG. 1A
FIG. 1A is a plan view on a larger scale than FIG. 1 showing the prior art check valve seen in FIG. 1.

FIG. 4 is a plan view of a design of check valve contemplated by the invention, shown on the same scale as FIGS. 1A and 2A.

FIGS. 5–11C are on a larger scale than any of the preceding drawings. FIG. 5 is a plan view of the same prior art check valve as seen in FIG. 2A. FIG. 5 also diagrams certain flow paths associated with two of the six fuel delivery holes of the illustrated valve.

FIG. 6 is similar to FIG. 5, showing the same general type of valve but one having a smaller sealing width than the valve of FIG. 5. FIG. 6 also diagrams certain flow paths associated with two of the six fuel delivery holes of the illustrated valve.

FIG. 7 is a plan view of the same injector check valve contemplated by the invention that is seen in FIG. 4, but also diagrams certain flow paths associated with one of the three fuel delivery notches of the illustrated valve.

FIG. 8 is a plan view of a another injector check valve contemplated by the invention. The check valve of FIG. 8 has a smaller sealing width than the valve of FIG. 7, and a different notch shape. FIG. 8 also diagrams certain flow paths associated with one of the three fuel delivery notches of the illustrated valve. FIG. 8 is not believed to be a prior art valve and is not admitted to be part of the prior art, but is included for purposes of comparison in order to better disclose certain aspects of the invention.

FIG. 9 is a plan view of a hypothetical valve similar to the prior art valve shown in FIG. 1A but modified in shape. FIG. 9 also diagrams certain flow paths for purposes of comparison with the other valves described. FIG. 9 is not believed to be a prior art valve and is not admitted to be part of the prior art, but is included for purposes of comparison in order to better disclose certain aspects of the invention.

FIG. 10 is a fragmentary plan view of another valve contemplated by the invention.

FIGS. 11A, 11B, and 11C are diagrams of certain flow path areas extracted from the other drawings or otherwise developed for purposes of comparing the invention with injector check valve installations of the prior art.

DETAILED DESCRIPTION OF THE INVENTION

In order that the invention may be most clearly understood, a diesel locomotive fuel injector of the EMD type will first be described in some detail. Such an injector 20 is shown in cross-section in FIG. 1, utilizing a prior-art scalloped-edge check valve 4*a* (shown in plan view in FIG. 1A).

The housing-nut 21 of the injector 20 is threaded to and is an extension of the main housing (not shown) for the pump-injection unit. The nut 21 extends from the main housing, which is at the exterior of the engine, through the engine wall to the combustion chamber, and is clamped in the engine wall in a well known manner. The housing-nut houses the stacked main injector components described below and threadedly clamps them in their stacked relationship in a well known manner.

EMD-type nozzles have an injection valve with differentially sized guide and seat so that there is a fixed relationship between the valve opening pressure and the valve closing pressure. During injector operation when the plunger 1 covers the fill port 2*a* in the bushing 3, see FIG. 1, a pressure wave is generated which travels through the inlet opening 19 past the check valve 4*a* into the chamber portion 24 below the check valve and through the fuel ducts 5 (only one of three is seen in the particular section shown) in the check valve cage 6, through the annulus 7, fuel ducts 9 in the spring cage 8, into the illustrated connecting top annulus and the fuel ducts 13 (again, only one of three is seen in the particular section) of the nozzle body 10, and into the cavity 14 where the pressure wave acts on the conical differential area 15 of the nozzle valve 11 to lift the needle of the nozzle valve off its seat and injection begins.

The fuel passes the check valve 4*a* through delivery passages 35*a* (FIG. 1A). In the illustrated valve, these passages have the form of wide notches or scallops. The check valve stays lifted during the time fuel is being delivered by the plunger 1 to the nozzle 10. The check valve rests on the shoulder 25 (FIG. 3) when fully lifted. When the plunger helix edge 17 uncovers the spill port 2*b* in the bushing 3, the pressure above the plunger drops to fuel supply pressure and the check valve 4*a* seats (upwardly) on the flat bottom surface of the spacer 18, sealing the fuel inlet hole 19. As these events occur, the pressure in the nozzle fuel chamber 14 then drops rapidly; when it drops to the nozzle valve closing pressure, the nozzle valve 11 closes and injection ends.

In a well known manner, the angular position of the plunger is changed by a control rack (not shown) to control the amount of fuel delivered with each stroke of the plunger 1 by varying the positions in the stroke at which the fill and spill ports 2a and 2b are closed and opened.

Check valves of other designs have been used in diesel fuel injectors such as the injector 20 described above, as illustrated in FIG. 2 in which a check valve 4b replaces the check valve 4a of FIG. 1. Check valves of the FIG. 2 design and similar variants are illustrated in aforesaid U.S. Pat. No. 5,328,094 (as is the check valve design of FIGS. 1 and 1A) and may show improved anti-knocking performance as compared to earlier valves. Particularly referring to illustrated valve 4b, the delivery passages 35b of valves of this design comprise a number of holes equally spaced outward from the inlet opening 19 in the centered position of the valve.

The invention contemplates combining check valves of designs that significantly differ from the foregoing designs with injectors such as the injector 20, as illustrated in FIG. 3 in which a check valve 4c replaces the earlier designs of valve. This same valve is also shown on a larger scale in FIG. 7. The check valve 4c has fuel delivery passages in the form of notches 35c. The bottoms or radially inner edges 36c (FIG. 7) of the notches 35c are formed as concave edges (concave with reference to defining the shape of the notches themselves, as distinguished from defining the shape of the solid disc through which the notches are punched, cut or otherwise formed—the latter shape being of course complementary to the former and therefore convex where the other is concave), and preferably are spaced a constant radial distance from the inlet opening in the centered position of the valve, as shown. This concave shape differs from the convex shapes of the bottoms or radially innermost edges 36a (FIG. 1A) and 36b (FIG. 5) of the prior art valves 4a and 4b.

The valves 4a, 4b and 4c are shown in the drawings in their open position. In these open positions, the radially outer portions of the flat bottom check valve faces normally rest on the shoulder 25. In closed position, the flat upper faces of the check valves rest against the flat lower face 16 (FIG. 3) of the spacer 18, sealing off the fuel inlet hole 19.

To operate freely, the check valves must have a smaller diameter than the surrounding circular wall, 22 (FIG. 3) of the check valve cage. In the drawings, the open check valves are shown in exactly centered position, with equal radial clearances on each side, so that the inlet hole or opening 19 is exactly centered therewith. The areas of the valves that are involved in the sealing process are the areas on the upper valve faces between the circle representing the inlet opening 19 and a second imaginary circle passing through the radially innermost points on the edges of the delivery passages 35a, 35b or 35c when the valve is centered, such second circle for each design of valve being the radially outermost circle of annular continuity.

The centered condition is the condition of maximum sealing width. To the extent a valve is not exactly centered in its closed position, the sealing width is reduced and parts of the area between the two mentioned circles that are radially outward of the radially outermost limit of the sealing width at its narrowest point become in a sense superfluous to sealing because, under the non-centered condition then applying, the seal would be no narrower if there were openings in such parts. (Nevertheless, the areas between the two mentioned circles associated with each valve design may logically be termed the sealing areas of the valves, because all points within such areas may contribute to sealing; whether a particular part of such an area does or contribute depends on whether and how much the valve is off center.) All other areas of the valve face 4a are never involved in the sealing process and may be referred to as non-sealing areas.

The greatest possible reduction in sealing width (from the maximum sealing width that applies in the centered condition) is equal to the radial clearance of the disc when in its centered condition. In other words, depending on how far the disc is off center, the sealing width will be reduced by varying amounts, and the most it may be reduced is to a value equal to the maximum sealing width minus the radial clearance of the disk. No assured measure of length can be assigned to this value unless tolerances are taken into account. Assuming exact concentricity of the circular wall of inlet 11 and the circular wall 22 of the check valve chamber, the assured minimum sealing width is the minimum sealing width if the radius of the wall 22 is at its extreme tolerance on the plus side, the radius of the check valve is at its extreme tolerance on the minus side, and the distance of at least one of the radially inner edges of the fuel delivery passages from the inlet hole is at its extreme tolerance on the minus side. References in this disclosure to different valve designs as having the same sealing width will therefore be understood to imply comparisons between installed valves where the same tolerances apply for each valve.

For purposes of comparison, the radial distances from the inlet 19 to the closest points on the edges of the delivery passages 35b and 35c are shown as the same in the centered positions of the valves 4b and 4c; therefore these valves are shown as having the same sealing width. The sealing width of the prior art valve 4a is shown to be greater, because the sealing width of valves of this type was typically large.

When the valves are open, fuel flows radially outward and between the flat lower face 16 (FIG. 3) of spacer 18 and the flat upper face of the valve disc 4a, 4b or 4c. The flow of fuel between the two flat surfaces is of course interfacial with respect to the two faces presented by the two flat surfaces. The fuel then flows down through a fuel delivery passage 35a, 35b or 35c, such flow of course being non-interfacial with respect to the same flat surfaces.

Such interfacial flow includes flow along relatively short paths of interfacial flow at relatively high flow velocities as compared to flow along any other paths included in the interfacial flow, since such relatively short paths present the lowest resistance to flow. These relatively short paths lead straight from the inlet 11 to the delivery passages and sweep out areas of relatively high-velocity interfacial flow, a third of the total swept area associated with the valves 4b and 4c being indicated diagrammatically as the pair of areas 38b in FIG. 5. The width of each area 38b is defined by and equal to the diameter of each delivery passage 35b, because an area of any greater width would not be limited to "shortest possible" straight flow but would also involve curvilinear paths. In FIG. 7, the single area 38c is, as shown, twice as wide as each area 38b and therefore is associated with the same total cross-sectional flow area as are the two areas 38b taken together. The area 38c is also comprised entirely of "shortest possible" straight flow; additional longer paths of straight flow (not shown) are also present out to the annular-direction extremities of the notch 35c but these are all longer paths than those within the area 38c, and will experience relatively low velocity flow compared to paths within such area. (To the extent that the existence of such additional paths of straight flow may ameliorate flow demands on the paths within the area 38c, average flow velocity of all the paths of straight flow is decreased; this is an additional factor making the comparison between area 38c and the pair of areas 38b a fair one).

The areas 38b and 38c just described are associated with check valves 4b and 4c; a corresponding area of relatively high-velocity flow is not diagrammed for check valve 4a, but will be understood to be substantially greater in magnitude than the diagrammed areas due to the relatively great spacing between the radially innermost edge 36a and the inlet 19.

The great majority of total through-put occurs across these areas of relatively high-velocity interfacial flow, in other words along the paths of relatively short interfacial flow that make up these areas. These paths are infinitesimal in width in the sense that the areas they cover constitute sets of arbitrarily narrow adjacent paths.

FIG. 11A reproduces and directly compares the area 38c and the pair of areas 38b, showing that the area 38c is substantially less than the sum of the two areas 38b. That is, the total area of relatively high-velocity interfacial flow between the upper face of the valve 4c and the fixed face 18 is substantially less than the total area of relatively high-velocity flow between the upper face of the valve 4b and the fixed face 18.

For further purposes of comparison, FIG. 9 shows a hypothetical valve 4d similar to the prior art valve 4a but modified so that the sealing width of the modified valve is shown as the same as that of the valves 4b and 4c. That is, the distance from the inlet 19 to the closest point on each fuel delivery passage or notch 35d of valve 4d is the same as the corresponding distances in valves 4b and 4c. An area 38d of relatively high-velocity interfacial flow is also diagrammed. The area 38d is diagrammed as having the same width as the area 38c or the combined two areas 38b, and therefore is associated with the same total cross-sectional flow area as are the corresponding sets of "shortest combined possible" paths in the area 38c or in the combined two areas 38b.

The area 38d is also diagrammed in FIG. 11A so that the area 38c may be better compared to it. Again, it will be seen that area 38c is substantially the lesser of the two areas, indicating that the total area of relatively high-velocity interfacial flow between the upper face of the valve 4c and the fixed face 16 would be substantially less than the total area of relatively high-velocity flow between the upper face of the valve 4d and the fixed face 16.

FIGS. 6 and 8 are similar to FIGS. 5 and 7, and again show the respective valves as having the same sealing width; however, the sealing width is reduced as compared to the valves of FIGS. 5 and 7. Also, the side edges of the fuel delivery passages or notches 35f are shaped to extend the annular extent of the radially innermost edge of the notch, as shown.

The areas of relatively high-velocity interfacial flow may be compared as before. Thus, the pair of areas 38e and the area 38f are compared in FIG. 11B. It will be seen that the area 38f is smaller in proportion to the pair of areas 38e than was the case in the earlier similar comparison between the area 38c and the pair of areas 38b. In other words, the greater the reduction in sealing width, the greater the proportionate reduction in area of high-velocity interfacial flow that is accomplished by the present invention. This relationship is demonstrated in extreme form in FIG. 11C which illustrates the areas of relatively high-velocity flow 38g and 38h that would apply were the sealing width to approach zero (which obviously would be impractical).

Another form of valve contemplated by the invention is shown in FIG. 10. A valve 4i is provided with fuel delivery passages 35i shaped as slots rather than notches. The radially innermost edge 36i of this slot has a concave shape, as in the case of the corresponding edges associated with the valves 4c and 4f.

The valve 4i is less preferred than the valve 4c or 4f because the latter are lighter and the response time to lift and close them is shorter. Closing the valve more rapidly gives greater assurance that the injector tip closing pressure will determine a satisfactorily high residual pressure downstream of the valve. Also, because of the higher residual pressure and more rapid response of the valve, the succeeding injection may be sharper and the fuel better atomized.

The sizes of the "kidney slot" portions of the fuel delivery passages 35c, 35f or 35i are preferably based not on the sizes of other fuel ducts, but on the sizes of the orifices of the injector tip. It has been found that, to minimize injector tip energy loss, it is desirable to make the upstream passages slightly larger than those following. Thus, the flow areas of the passages upstream of the injector tip should be at least four times the combined area of the orifices of the injector tip. Thus the size of the "kidney slot" portions of the fuel delivery passages (not including their "T-legs," such as the radially outermost parts of notches 35c or 35f) should be based on the total areas of the orifices of the injector tip having the largest orifices and greatest number of orifices. In order to be prepared for further increases in injector output and total injector tip orifice area as a result of upgrading of engine power, the slot areas may be made about 20 percent larger than such injector tip reference area.

It will be seen that in valves contemplated by the invention, such as all the valves 4c, 4f and 4i, the radially innermost edges 36c, 36f and 36i of the fuel delivery passages 35c, 35f and 35i are concave along the major part of their annular extents. Still other valve constructions having this feature may be utilized; for example the valve 4c with its trio of notches 35c may be replaced by a valve having a pair of similarly shaped notches, which are diametrically opposed, with the annular extents of the notches being extended to about half again the length of the notches 35c.

The invention is not to be limited to details of the above disclosure, which are given by way of example and not by way of limitation. Many refinements, changes and additions are possible as will be evident from the variations between the embodiments that have been explicitly described above.

What is claimed is:

1. In a high output high pressure diesel unit injector of the EMD type having an injector nozzle, a plunger bushing, a check valve cage, a check valve within the cage, and a spacer interposed between the bushing and cage, said check valve comprising a disc with upper and lower parallel flat disc surfaces parallel to each other, said check valve having fuel delivery passages opening therethrough and annularly spaced at equal intervals around its annular extent, said fuel delivery passages being formed as slot or notch openings through the parallel flat surfaces, said cage and check valve defining a diametral clearance between the check valve outside diameter and cage inside diameter for free movement of the check valve, the spacer having a flat surface to serve as the check valve seat to prevent fuel from leaking back into the plunger bushing when the check valve is seated against the spacer flat surface, the spacer having a central inlet hole through which fuel flows from the plunger bushing bore, the valve having a sealing width defined by the radial distance from said inlet hole to the closest points on said fuel delivery passages when the valve is centered over the inlet hole, the fuel flowing from said central inlet hole generally radially outward and between said spacer flat surface and said disc upper flat surface, said flow between said latter two flat surfaces being interfacial with respect to the faces presented by said latter two flat surfaces, fuel then flowing non-interfacially down through said fuel delivery passages, the check valve cage having an internal shoulder at the outer edge of the check valve to limit the check valve lift, said check valve cage also having a fuel chamber below said shoulder, said fuel chamber receiving fuel which has flowed through said fuel delivery passages, said shoulder being sufficiently narrow to permit said flow of fuel through said fuel delivery passages to said fuel chamber, the valve cage having outlet passages connecting said fuel chamber with downstream passages leading to conduits for delivering fuel to the injector nozzle, said interfacial flow of said fuel including flow along relatively short paths of interfacial flow at relatively high flow velocities and through-put rates as compared to flow along any remaining paths included in said interfacial flow, said short paths together sweeping out areas of relatively high velocity interfacial flow, the improvement wherein the radially innermost edges of said fuel delivery passages themselves, as distinguished from the edges of the solid discs in which they are formed, are concave along a major part of their annular extents.

2. A device as in claim 1, said radially innermost edge of each said fuel delivery passage being spaced a constant radial distance from the inlet opening in the centered position of the valve along at least a majority of the annular extent of the fuel delivery passage.

3. A device as in claim 1, said fuel delivery passages extending to and interrupting the circular periphery of the valve disc.

4. A device as in claim 3, said fuel delivery passages comprising T-shaped notches each consisting of a T-head and a T-leg, each T head being a kidney-shaped slot portion having one of said radially innermost edges as one of its sides, each T-leg comprising a slot extending from the sides of a T-leg to and interrupting the circular periphery of the valve disc.

5. A device as claimed in claim 1, said fuel delivery passages comprising kidney shaped slots each having one of said radially innermost edges as one of its sides, the circular periphery of the valve disc being continuous.

* * * * *